US011032058B2

(12) United States Patent
Carroll (10) Patent No.: US 11,032,058 B2
(45) Date of Patent: Jun. 8, 2021

(54) CONTROLLED CHAOTIC SYSTEM FOR LOW PROBABILITY OF DETECTION (LPD) COMMUNICATION

(71) Applicant: The Government of the United States of America, as represented by the Secretary of the Navy, Arlington, VA (US)

(72) Inventor: Thomas L. Carroll, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 125 days.

(21) Appl. No.: 15/786,043

(22) Filed: Oct. 17, 2017

(65) Prior Publication Data

US 2018/0145824 A1 May 24, 2018

Related U.S. Application Data

(60) Provisional application No. 62/408,949, filed on Oct. 17, 2016, provisional application No. 62/573,052, filed on Oct. 16, 2017.

(51) Int. Cl.
*H04L 9/12* (2006.01)
*H04L 9/00* (2006.01)

(52) U.S. Cl.
CPC ............... *H04L 9/001* (2013.01); *H04L 9/12* (2013.01)

(58) Field of Classification Search
CPC .................................. H04L 9/001; H04L 9/12
See application file for complete search history.

(56) References Cited

U.S. PATENT DOCUMENTS

| 6,571,255 | B1* | 5/2003 | Gonsalves | G11B 27/034 |
|---|---|---|---|---|
| 7,668,314 | B2* | 2/2010 | Kuwabara | H04N 21/23897 |
| | | | | 380/261 |
| 2002/0154770 | A1* | 10/2002 | Short | H03M 7/30 |
| | | | | 380/46 |
| 2005/0021539 | A1* | 1/2005 | Short | H03M 7/40 |
| 2008/0089394 | A1* | 4/2008 | Poberezhskiy | H04B 1/707 |
| | | | | 375/145 |
| 2009/0175258 | A1* | 7/2009 | Wang | H04J 13/00 |
| | | | | 370/347 |
| 2010/0091700 | A1* | 4/2010 | Michaels | H04W 48/16 |
| | | | | 370/328 |
| 2012/0327975 | A1* | 12/2012 | Michaels | H04B 1/707 |
| | | | | 375/140 |
| 2013/0129088 | A1* | 5/2013 | Ivarez Maranon | G06F 7/586 |
| | | | | 380/46 |

* cited by examiner

*Primary Examiner* — Khoi V Le
(74) *Attorney, Agent, or Firm* — US Naval Research Laboratory; William P. Ladd (57) ABSTRACT

Systems and method are provided for using chaotic signals for low probability of detection (LPD) communications. Embodiments of the present disclosure provide systems and methods for synchronizing chaotic systems and then encoding information on a signal in a way that produces little or no signature (e.g., using a bit flipping technique or a chaos control encoding technique). Systems and methods in accordance with embodiments of the present disclosure can work with noise larger than the signal, so they are suitable for communication in noisy environments.

20 Claims, 12 Drawing Sheets

CONTROLLED CHAOTIC SYSTEM FOR LOW PROBABILITY OF DETECTION (LPD) COMMUNICATION

CROSS REFERENCE TO RELATED APPLICATIONS

This application claims the benefit of U.S. Provisional Patent Application No. 62/408,949, filed on Oct. 17, 2016, and U.S. Provisional Patent Application No. 62/573,052, filed on Oct. 16, 2017, both of which are incorporated by reference herein in their entireties.

FIELD OF THE DISCLOSURE

This disclosure relates to communication signal encoding, communication including signal encoding using chaotic signals.

BACKGROUND

Avoiding interference is a goal for communications signal transmitters. In unlicensed bands (e.g., WiFi, cordless phones, etc.) it is required that signals don't create significant interference with each other. Additionally, in military applications, it is a goal that military signals (e.g., Navy communications and radar signals) should not interfere with civilian signals. In many military applications, it is also a goal for communications signal transmitters to minimize detectability. Nonlinearities unique to every signal emitter can be used to fingerprint that specific emitter, so individual emitters can be tracked. Most digital communications signals have signatures that can reveal their presence. It is useful to have signals with no signatures for covert communications.

Chaotic signals could be useful for communications, due, for example, to their broadband nature and unpredictability. Conventional schemes for using chaotic signals suffer from several drawbacks. For example, previous methods of using chaotic signals for communication suffer from difficulty in synchronizing a transmitter and receiver. Further, noise has been a problem for many chaotic communications schemes. Conventional methods for synchronizing chaotic systems are sensitive to noise, so many conventional chaotic communications schemes avoid synchronization by using non coherent techniques. Non coherent techniques, unfortunately, offer higher bit error rates in noise.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

As discussed above, the broadband nature and unpredictability of chaotic signals can be useful for communications. Further, because no periodic orbits of a chaotic system are stable, chaotic signals are not cyclostationary. That is, they have no statistical properties that vary periodically. Cyclostationarity can be used to detect the presence of a communications signal. Because chaotic signals aren't cyclostationary, they may appear to be random noise, making them useful for low probability of detection (LPD) communications.

Embodiments of the present disclosure provide systems and methods for using chaotic signals for LPD communications that address limitations of conventional systems. For example, in an embodiment, communications signals in accordance with an embodiment of the present disclosure have a low probability of detection, don't interfere with other signals, and can't be used to identify the specific transmitter of the signals. Embodiments of the present disclosure provide systems and methods for synchronizing chaotic communication using a transmitter and receiver without requiring a global positioning satellite (GPS) signal to synchronize the transmitter and receiver. Embodiments of the present disclosure then encode information on one of the signals in a way that produces little or no signature (e.g., using a bit flipping technique or a chaos control encoding technique). Systems and methods in accordance with embodiments of the present disclosure can work with noise larger than the signal, so they are suitable for communication in noisy environments.

In an embodiment, the structure of a chaotic system is used to synchronize a chaotic transmitter to a receiver. Once synchronization is achieved, two methods are presented for encoding information. For example, multiplying the chaotic signal by ±1 can be used to encode the binary signals 1 or 0. The binary information can be recovered by cross correlating the transmitted signal with the synchronized signal in the receiver. In an embodiment, this bit flipping encoding technique offers a comparable bit error performance to that of binary phase shift keying (BPSK). In an embodiment, this bit flipping technique and it offers communications privacy, but techniques such as spectral correlation can reveal the signature of the bit flipping. In another embodiment, using a chaos control technique, no signature is detectable by spectral correlation. In an embodiment, the bit flipping technique has a better bit error rate than the chaos control technique.

Embodiments of the present disclosure provide a power-efficient, coherent communication system. Synchronization of a transmitter and receiver in accordance with embodiments of the present disclosure does not require a Global Positioning Satellite (GPS) signal. Embodiments of the present disclosure provide signals with no detectable signature that have a broad spectrum and that have low interference with other signals.

2. Exemplary Methods for Synchronizing a Transmitter and Receiver

In an embodiment, chaotic signals are broadband signals that are deterministic but hard to predict. Many chaotic signals are sensitive to initial conditions, and small changes in a chaotic system can multiply over time. In a chaotic system, a Lyaponov exponent can indicate how small displacements change over time. In an embodiment, chaos can occur in a system that is characterized by being a nonlinear, dynamic system with at least one Lyapunov exponent greater than 0. Embodiments of the present disclosure provide systems and methods for using chaotic signals for LPD communications that address limitations of conventional systems.

In an embodiment, a transmitter and receiver using chaotic communications are synchronized so that the receiver can decode a signal transmitted by the transmitter based on known properties of the chaotic signals used for communications. For example, in an embodiment, because the chaotic signal sent by the transmitter can change in deterministic ways based on the initial conditions at the transmitter when the signal is transmitted, data sent by the transmitted can be encoded (e.g., modulated) and then decoded (e.g., demodulated) by the receiver if the receiver knows these initial conditions. In an embodiment, a transmitter and receiver can be synchronized using a chaotic map and a dictionary of known chaotic map sequences. In an embodiment, after the transmitter and receiver are synchronized, data transmitted by the transmitter can be modulated (e.g., using a lower power bit flipping technique or a lower probability of detection chaos control technique).

Figure 1A:
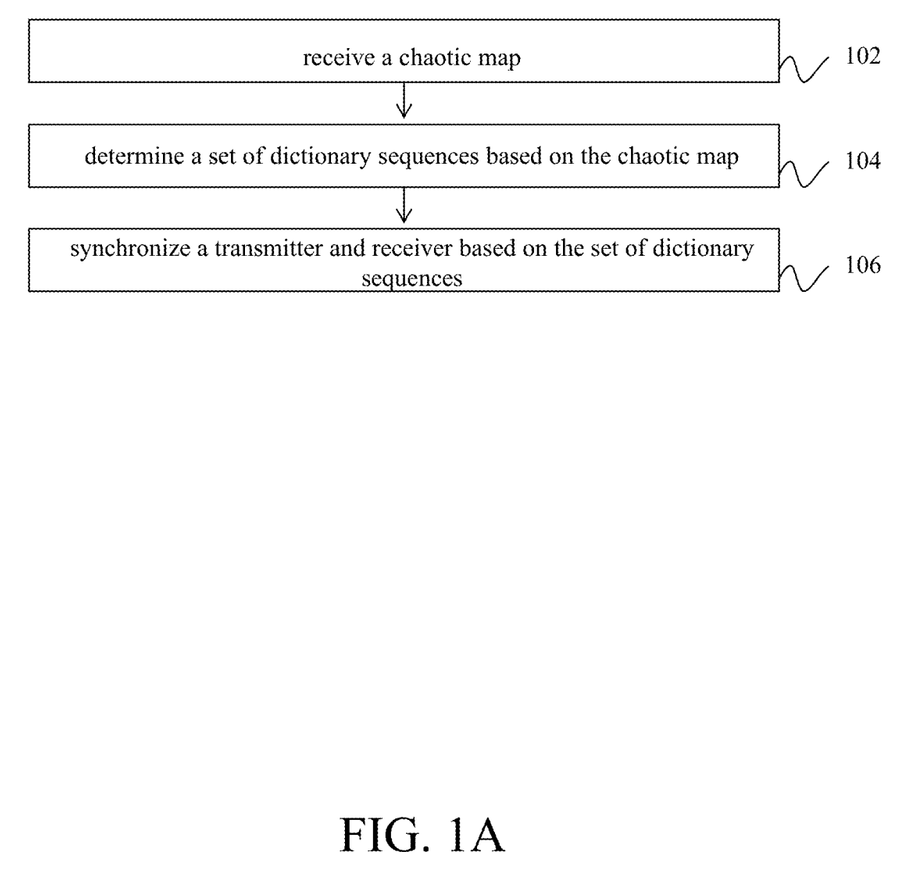
FIG. 1A is a flowchart of an exemplary method for synchronizing a transmitter and receiver for LPD controlled chaotic communication in accordance with an embodiment of the present disclosure.

FIG. 1A is a flowchart of an exemplary method for synchronizing a transmitter and receiver for LPD controlled chaotic communication in accordance with an embodiment of the present disclosure. The steps of FIG. 1 will now be discussed with further reference to FIG. 2A. In step 102, a chaotic map is received. For example, in an embodiment, a device (e.g., a transmitter, a receiver, a transceiver, or other device) can receive (e.g., from a user, a chaotic map generator internal or external to the device, another third party device, etc.) a chaotic map that contains a set of numbers or data. In an embodiment involving communication with multiple parties, two or more parties can given the chaotic map. For example, in an embodiment including a transmitter and receiver, both the transmitter and receiver can be given the chaotic map.

In an embodiment, the chaotic map is characterized by its instability (e.g., nonlinearity) and bounded nature (e.g., the instability(ies) of the map are controlled such that they are not drawn to infinity), and any chaotic map with these characteristics can be used in accordance with embodiments of the present disclosure. In an embodiment, for better applicability to LPD communication, a chaotic signal represented by a chaotic map should have a broad spectrum.

In an embodiment, the chaotic map can be a set of rules describing how a chaotic system behaves over time (e.g., rules that govern relationships between elements of the chaotic system). For example, in an embodiment, the chaotic map can contain rules that map one number (or set of numbers) into another number (or set of numbers) based on the instability(ies) and bound(s) of the map. For example, equation (1) below shows an exemplary chaotic map that can be used in accordance with an embodiment of the present disclosure:

$$x_{n+1} = \begin{bmatrix} 2.0 & 0.5 \\ 0.2 & 0.6 \end{bmatrix} x_n \quad (1)$$

$$x_{n+1}(1) = \mod[x_{n+1}(1), 1]$$

Figure 2A:
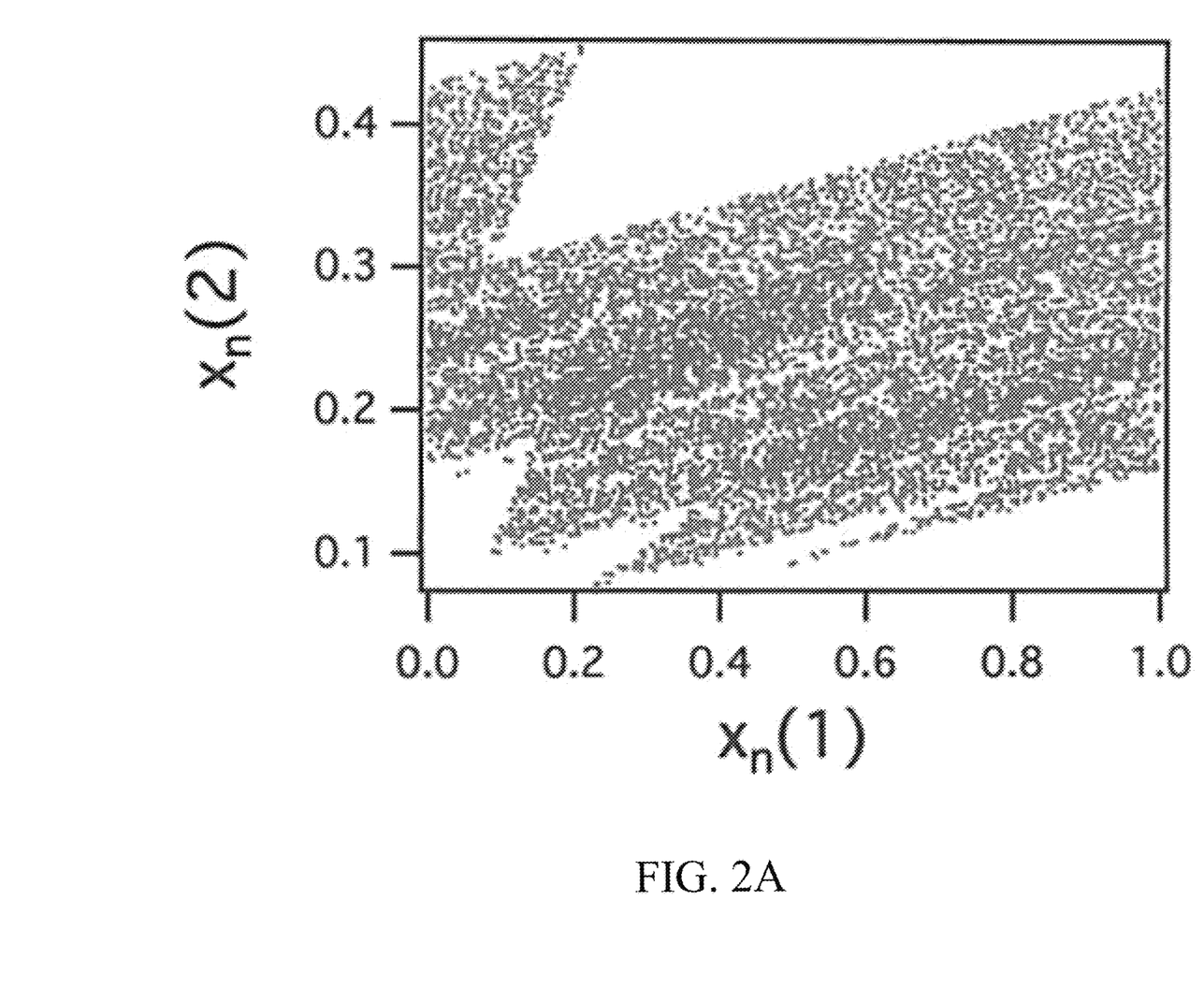
FIG. 2A is a plot based on a chaotic map in accordance with an embodiment of the present disclosure.

In equation (1) above, the modulus operator "mod" introduces a bound to the otherwise instable (e.g., nonlinear) equation, making it useful as a chaotic map. FIG. 2A is a plot based on a chaotic map in accordance with an embodiment of the present disclosure. Specifically, FIG. 2A is a plot of $x_n(2)$ vs. $x_n(1)$ from the map of equation 1 above.

In step 104, a set of dictionary sequences is determined based on the chaotic map. Determining a set of dictionary sequences based on the chaotic map can be done use a variety of techniques in accordance with embodiments of the present disclosure. Two exemplary embodiments for determining the set of dictionary sequences are shown with reference to FIGS. 1B and 1C, respectively.

In step 106, a transmitter and receiver are synchronized based on the set of dictionary sequences. The transmitter and receiver can be synchronized using a variety of techniques in accordance with embodiments of the present disclosure. An exemplary technique for synchronizing the transmitter and receiver is explained below with reference to FIG. 1D.

Figure 1B:
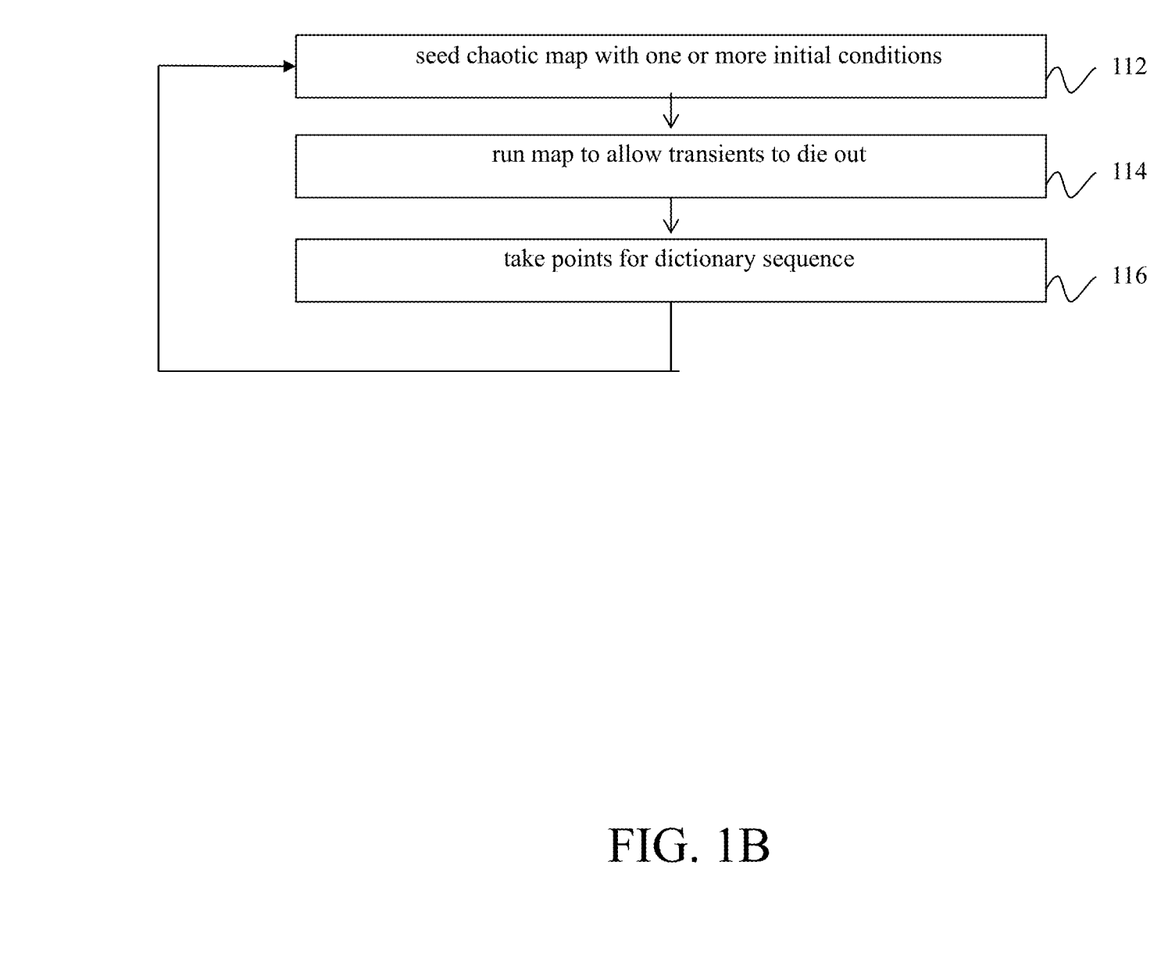
FIG. 1B is a flowchart of an exemplary method for determining the set of dictionary sequences based on the chaotic map in accordance with an embodiment of the present disclosure.

FIG. 1B is a flowchart of an exemplary method for determining the set of dictionary sequences based on the chaotic map in accordance with an embodiment of the present disclosure. In step 112, the chaotic map is seeded with one or more initial conditions. For example, in an embodiment, the chaotic map can be seeded with one or more random initial conditions. In step 114, the map is run to allow transients to die out. For example, in an embodiment, the chaotic map (using, in an embodiment, an equation such as equation (1)) should be allowed to run with these initial conditions to allow transients to die out. In step 116, points for a dictionary sequence are taken. For example, in an embodiment, after transients have died out, the device storing the chaotic map (e.g., a transmitter) can start taking points for a dictionary sequence and store the dictionary sequence in memory. A dictionary sequence can store any number of points from the chaotic map in accordance with embodiments of the present disclosure. For example, a dictionary sequence can store all or part of a chaotic map run with particular initial condition(s). These points can start at the first point of the map, at a predetermined point in the map, or at a random point in the map (determined, for example, using a known random number generator) in accordance with embodiments of the present disclosure.

In an embodiment, steps 112-116 can be performed for each dictionary sequence, depending on the number of desired dictionary sequences for a dictionary. For example, for a second dictionary sequence, one or more second initial conditions can be used to seed the chaotic map, transients can be allowed to die out, points for the second dictionary sequence can be taken, and these points can be stored in the dictionary as the second dictionary sequence.

Figure 1C:
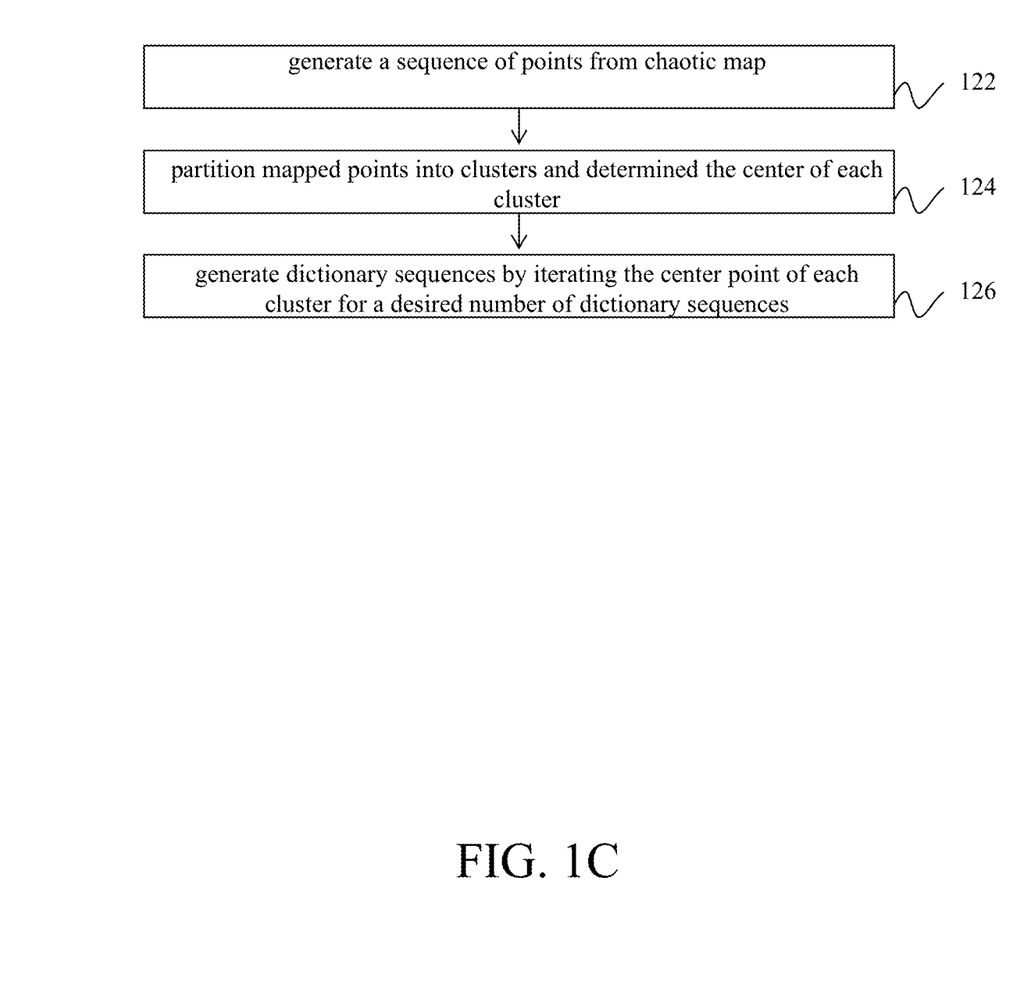
FIG. 1C is a flowchart of another exemplary method for determining the set of dictionary sequences based on the chaotic map in accordance with an embodiment of the present disclosure.

FIG. 1C is a flowchart of another exemplary method for determining the set of dictionary sequences based on the chaotic map in accordance with an embodiment of the present disclosure. FIG. 1C will now be discussed with reference to FIGS. 2B and 2C. In step 122, a sequence of points is generated from the chaotic map. For example, in an embodiment a chaotic map (e.g., a Bernoulli Shift Map or a chaotic map such as that of equation (1)) can be seeded with one or more initial conditions to generate a plurality of points (and, in an embodiment, transients can be allowed to die out).

Figure 2B:
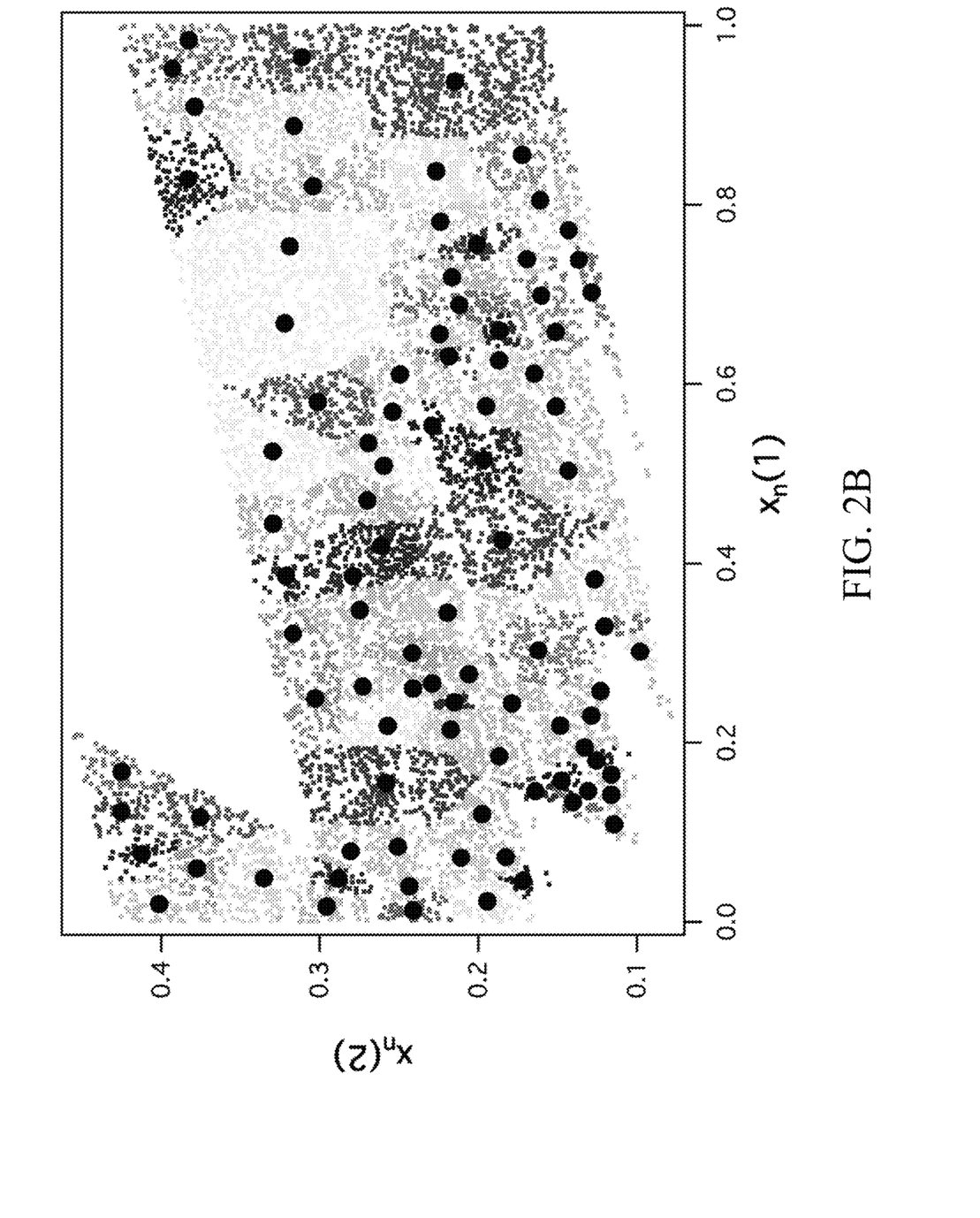
FIG. 2B is a plot showing a partitioning of the plot of FIG. 2A into clusters with the centers shown as dots in accordance with an embodiment of the present disclosure.
Figure 2C:
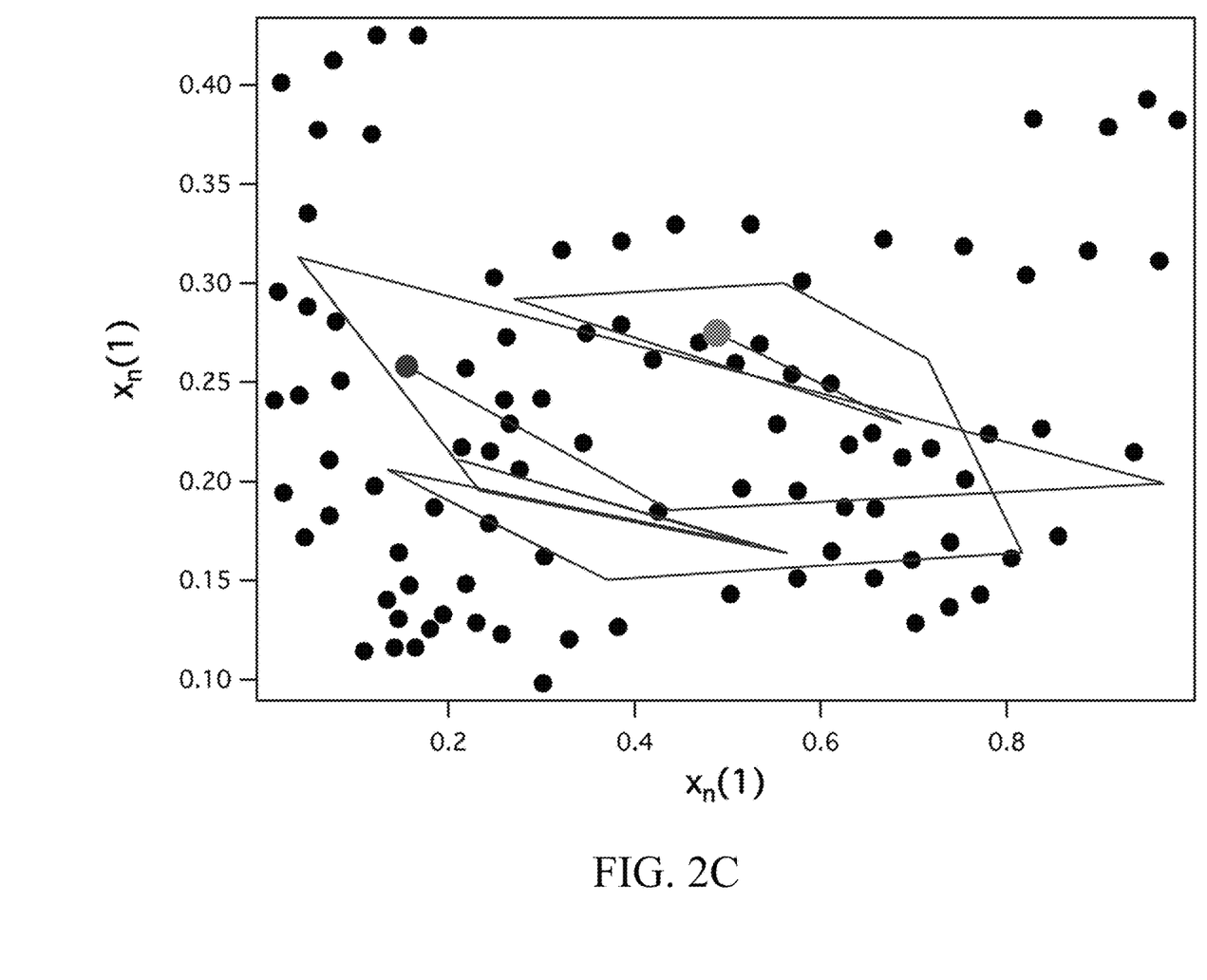
FIG. 2C is a plot showing dictionary sequences being generated from the cluster centers of FIG. 1B in accordance with an embodiment of the present disclosure.

In step 124, the mapped points are partitioned into clusters, and the center of each cluster is determined. For example, FIG. 2B is a plot showing a partitioning of the plot of FIG. 2A into clusters with the centers shown as dots. In step 126, dictionary sequences are generated by iterating the center point of each cluster for a desired number of dictionary sequences. For example, FIG. 2C is a plot showing (e.g., via lines of points between the points) dictionary sequences being generated from the cluster centers of FIG. 1B. In an embodiment, the number of dictionary sequences (e.g., lines of points in FIG. 2C) can be determined based on a desired number of sequences for the dictionary.

In an embodiment, after a dictionary of sequences has been built (e.g., at a transmitter), the dictionary can be provided (e.g., securely) to other devices for LPD communication with the transmitter (e.g., to one or more receivers). In an embodiment, based on this shared dictionary, a transmitter and receiver can be synchronized.

Figure 1D:
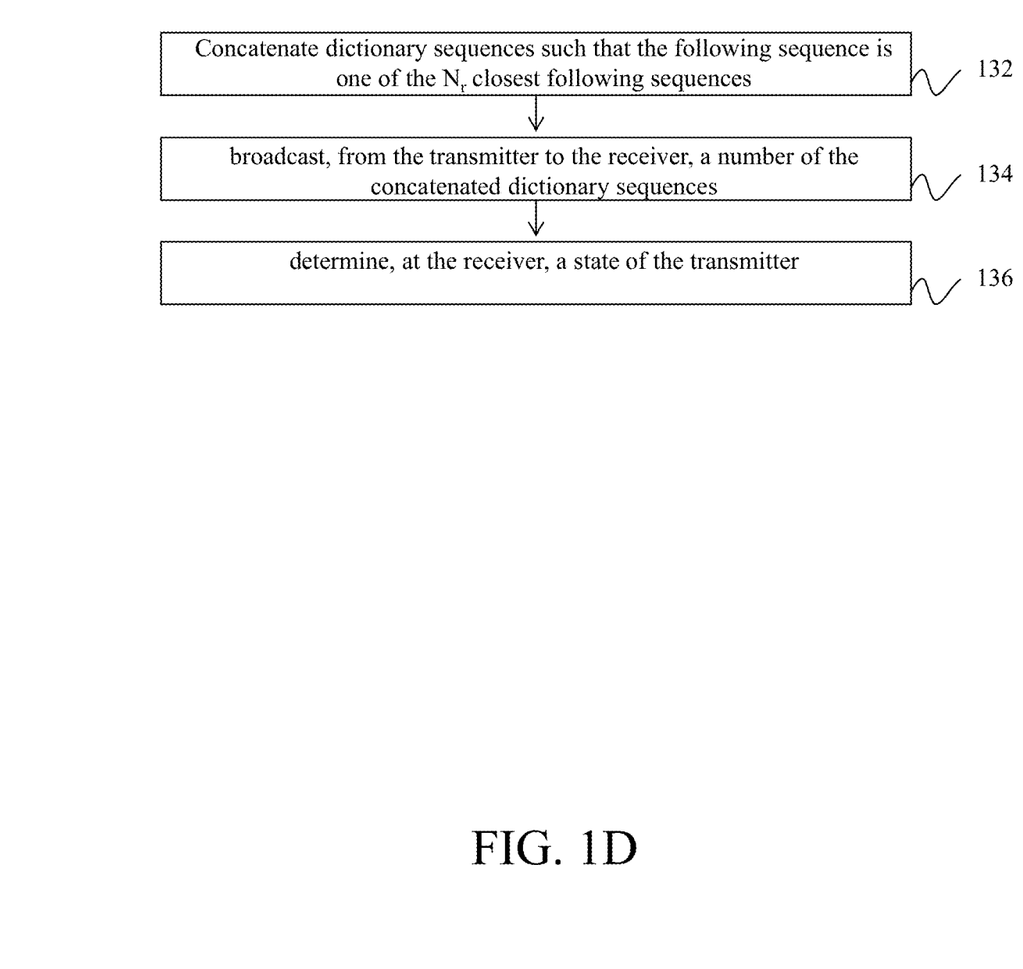
FIG. 1D is a flowchart of an exemplary method for a synchronizing a transmitter and receiver based on a set of dictionary sequences in accordance with an embodiment of the present disclosure.

FIG. 1D is a flowchart of an exemplary method for a synchronizing a transmitter and receiver based on a set of dictionary sequences in accordance with an embodiment of the present disclosure. FIG. 1D will now be discussed with reference to FIG. 2D. In step 132, the dictionary sequences are concatenated such that the following sequence is one of the $N_r$ closest following sequences. For example, as described above, a dictionary can contain a desired number of sequences. In an embodiment, the size of the dictionary can be determined based on a tradeoff between difficulty of detection and an error rate of a decoder (e.g., in a receiver). For example, in an embodiment, a larger dictionary size can make detection by a third party more difficult but can also make a receiver more likely to make an error by, for example, selecting a wrong sequence from its dictionary based on the larger number of sequences to choose from.

In an embodiment, from the sequences available in the dictionary, a number of them can be chosen to be transmitted to the receiver. Based on the number of sequences chosen, a set of sequences can be chosen, wherein each sequence in the set of sequences is selected such that each sequence is among the closest sequences in the dictionary to the preceding sequence. In an embodiment, each sequence in the set of sequences (except for the first sequence) is selected such that a beginning of each sequence in the set of sequences is among the closest (of sequences in the dictionary) to an end of the preceding sequence. In an embodiment, sequences in the set of sequences are selected one by one, and, as each sequence in the set of sequences is selected, it is concatenated to the previous sequence in the set of sequences.

For example, in an embodiment, a first sequence is selected (e.g., a predetermined sequence, a first sequence in the dictionary, a random sequence determined using a random number generator, etc.). In an embodiment, a decoder (e.g., a Viterbi decoder at a receiver) can determine which sequences were most likely to have been selected as the first sequence (e.g., based on transition probabilities of the chaotic map).

After the first sequence has been selected, near the end of the first sequence, a predetermined number of points corresponding to beginnings of nearby sequences are examined. In an embodiment, increasing the predetermined number of points can make detection harder by third parties but can also make it harder for a (legitimate) receiver to decode the transmission. In an embodiment, a sequence corresponding to one of the predetermined number of points corresponding to beginnings of nearby sequences is selected (e.g., a predetermined sequence, a first sequence in the dictionary, a random sequence determined using a random number generator, etc.) and concatenated to the first sequence. In an embodiment, a decoder (e.g., a Viterbi decoder at a receiver) can determine which sequences were possible to have been selected.

Figure 2D:
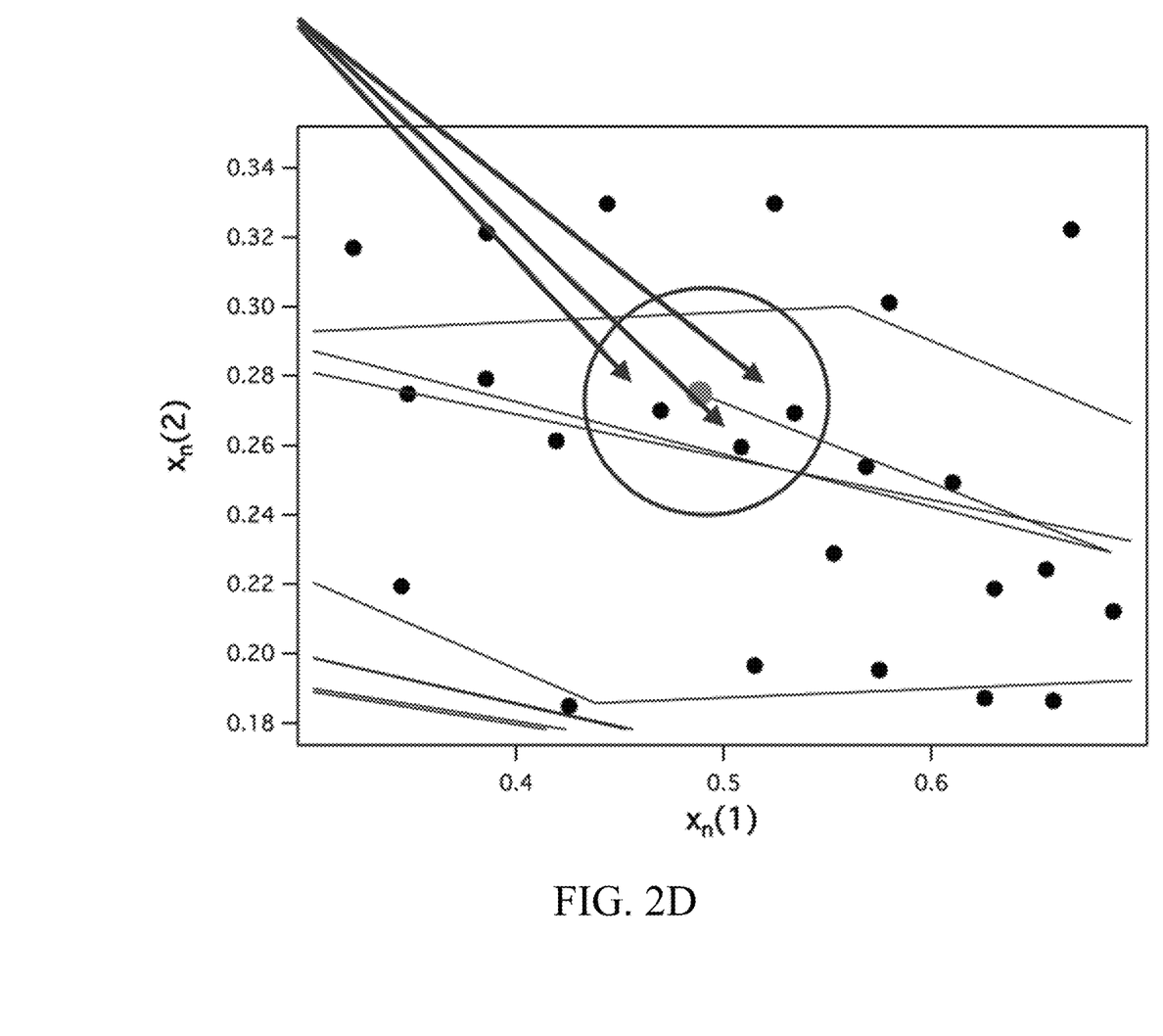
FIG. 2D is a plot illustrating concatenating a number of sequences together in accordance with an embodiment of the present disclosure.

In an embodiment, the above process can be repeated for each sequence in the set of sequences. For example, after the second sequence is selected, near the end of the second sequence, a predetermined number of points corresponding to beginnings of nearby sequences are examined, one point corresponding to a third sequence is selected, and the third sequence is concatenated to the second sequence. In an embodiment, the total number of sequences in the set of sequences can be chosen based on a tradeoff between signal to noise ratio (SNR) and energy needed to transmit the sequences. For example, choosing more sequences in the set of sequences can lower SNR but can also increase energy needed to transmit the sequences. FIG. 2D is a plot illustrating concatenating a number of sequences together in accordance with an embodiment of the present disclosure (e.g., concatenating a set of sequences from FIG. 2C).

In step 134, a number of the concatenated dictionary sequences is broadcast from the transmitter to the receiver. For example, if the transmitter will transmit $N_c$=10 sequences to the receiver, the transmitter can inform the receiver that it will transmit 10 sequences.

In an embodiment, the number of the sequences, the concatenated sequences, and an initial condition of the transmitter can be transmitted as a single transmission stream (e.g., signal) to a receiver that is indistinguishable from noise to a third party without access to the dictionary. In an embodiment, the preamble can contain the number of concatenated sequences, and the last point(s) of the transmission stream can be used to transmit the initial condition(s) at the transmitter.

In step 136, a state of the transmitter is determined at the receiver (e.g., using a decoder, such as a Viterbi decoder). For example, based on the dictionary of sequences and the known number of concatenated sequences, the receiver can determine at what point in the transmission stream the initial conditions(s) have been transmitted (e.g., at the end of the concatenated sequences). In an embodiment a decoder (e.g., a Viterbi decoder) can be used to watch for the incoming preamble that sets the number of the concatenated sequences (e.g., recognizing it using its dictionary), and, using the dictionary, can determine the initial condition(s). Using the method of FIG. 1D, the initial condition(s) can be transmitted to the receiver in a way that has a low probability of detection (e.g., because it is indistinguishable from noise to third parties without the dictionary and decoder). In an embodiment, the concatenation process in accordance with an embodiment of the present disclosure allows for the use of a decoder (e.g., a Viterbi decoder) that will find the most likely set of sequences over a number of intervals.

Figure 3A:
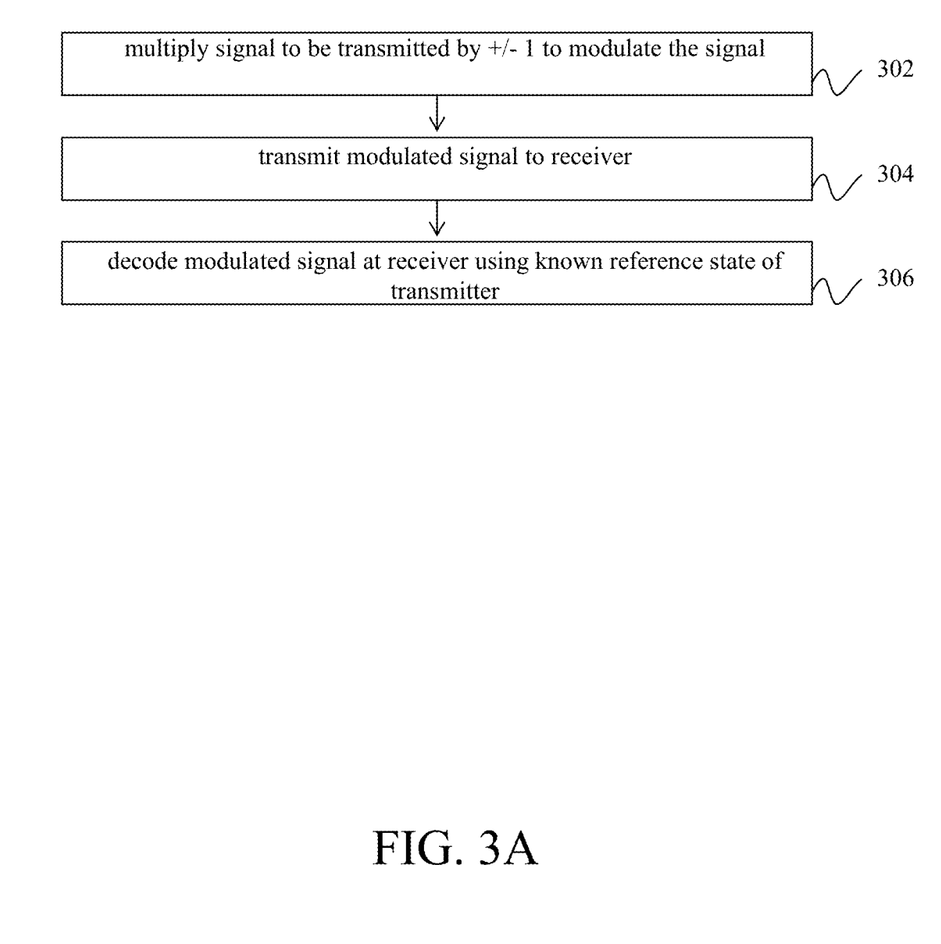
FIG. 3A is a flowchart of an exemplary method for encoding a signal between a synchronized transmitter and receiver using a bit flipping technique in accordance with an embodiment of the present disclosure.

3. Exemplary Methods for Encoding Communication between a Synchronized Transmitter and Receiver In an embodiment, once a transmitter and receiver have been synchronized, a signal transmitted from the transmitter to the receiver can be encoded based on the initial condition(s) known to both the transmitter and receiver. FIG. 3A is a flowchart of an exemplary method for encoding a signal between a synchronized transmitter and receiver using a bit flipping technique in accordance with an embodiment of the present disclosure. In step 302, the signal to be transmitted is multiplied by +/−1 to modulate the signal. In an embodiment, the cross-correlation of the signal at the receiver with the reference mapped signal will have a correlation of +1 or −1. In step 304, the modulated signal is transmitted to receiver. In step 306, the modulated signal is decoded at the receiver using known reference state of transmitter. In an embodiment, additional information can be encoded by transmitting a sum of the ortho-normalized state. In an embodiment, the receiver can decode additional information because of the known reference state (e.g., initial condition).

Figure 3B:
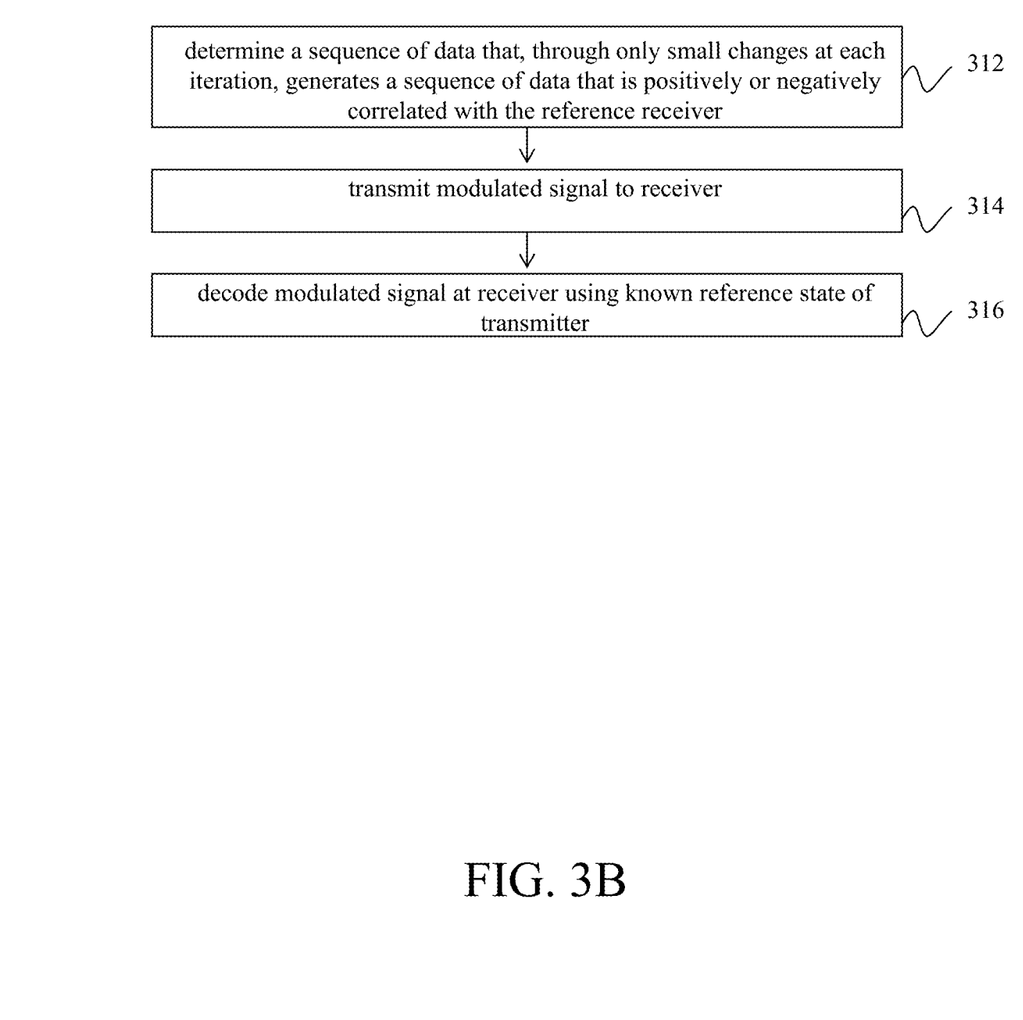
FIG. 3B is a flowchart of another exemplary method for encoding a signal between a synchronized transmitter and receiver using a chaos control technique in accordance with an embodiment of the present disclosure.

FIG. 3B is a flowchart of another exemplary method for encoding a signal between a synchronized transmitter and receiver using a chaos control technique in accordance with an embodiment of the present disclosure. In an embodiment, the chaos control technique of FIG. 3B capitalizes on the property of a chaotic system wherein small changes can result in large differences in outcome. In step 312, a sequence of data is determined that, through only small changes at each iteration, generates a sequence of data that is positively or negatively correlated with the reference receiver. For example, in an embodiment, map iterations can be encoded as + or − (+if>=0.5 and − if<0.5). In an embodiment, the last element in the signal to be transmitted represents the reference signal.

In step 314, the modulated signal is transmitted to the receiver. For example, instead of transmitting the sequence modulated by +/−1, transmit a sequence that through only small changes at each iteration generates a sequence that is positively or negatively correlated with the reference receiver. In step 316, the modulated signal is decoded at the receiver using a known reference state of the transmitter.

While two exemplary encoding methods have been discussed above with reference to FIGS. 3A and 3B, it should be understood that multiple encoding techniques can be used with synchronized transmitters and receivers in accordance with embodiments of the present disclosure.

4. Exemplary System for LPD Communication

Figure 4A:
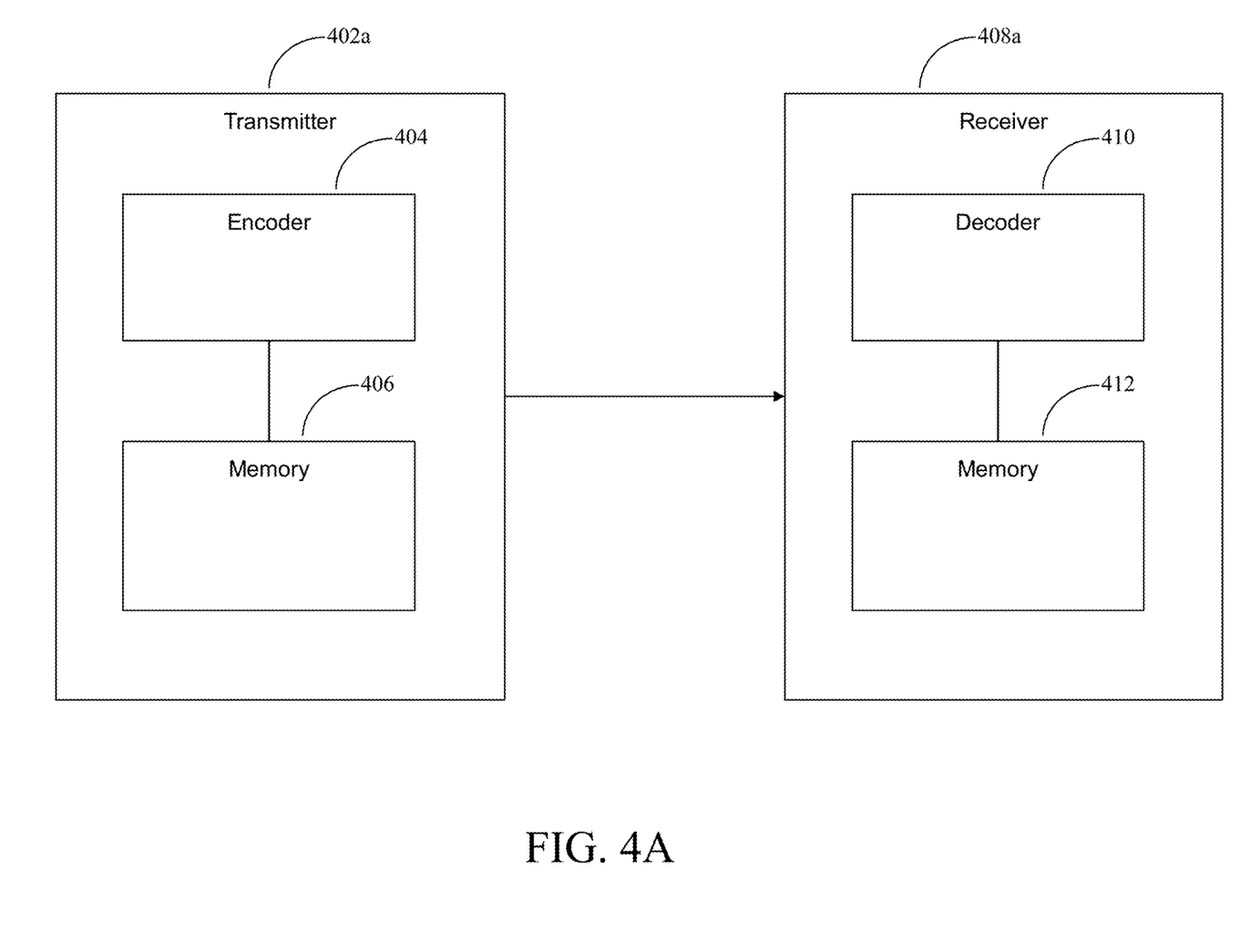
FIG. 4A is a diagram of an exemplary system for LPD communication in accordance with an embodiment of the present disclosure.

FIG. 4A is a diagram of an exemplary system for LPD communication in accordance with an embodiment of the present disclosure. In FIG. 4, a transmitter 402 is configured to transmit a signal to a receiver 408. In FIG. 4A, transmitter 402 has an encoder 404 (e.g., an encoding device) and a memory 406, and receiver 408 has a decoder 410 (e.g., a decoding device) and a memory 412. In an embodiment, encoder 404 and decoder 410 include processing devices (e.g., computer processors) or can access processing devices.

In an embodiment, transmitter 402a synchronizes to receiver 408a using, for example, a method described above with reference to FIGS. 1A-1D. For example, in an embodiment, transmitter 402a receives a chaotic map and stores it in memory 406. In an embodiment, receiver 408a also receives the chaotic map and stores it in memory 412. In an embodiment, transmitter 402a determines a set of dictionary sequences based on the chaotic map (e.g., using the method of FIG. 1B and/or FIG. 1C) to build a dictionary. Transmitter 402a can store this dictionary in memory 406. In an embodiment, transmitter 402a securely communicates the dictionary to receiver 408, which stores the dictionary in memory 412.

In an embodiment, using these stored dictionaries, transmitter 402a and receiver 408a can synchronize to each other (using, for example, the method of FIG. 1D). For example, in an embodiment, using encoder 404, transmitter 402a can determine a number of dictionary sequences to be transmitted, concatenate the number of dictionary sequences, and transmit a signal to receiver 408a including the number of dictionary sequences, the concatenated sequences, and one or more initial conditions at transmitter 402a. Receiver 408a can decode this signal using decoder 410 which can recognize a preamble in the signal containing the number of dictionary sequences and can determine, using decoder 410 and the stored dictionary in memory 412, the initial condition(s) in the signal, which can be used to synchronize receiver 408a to transmitter 402a. In an embodiment, transmitter 402a and receiver 408a can then securely encode and decode signals (using, for example, the methods of FIGS. 3A and/or 3B).

Figure 4B:
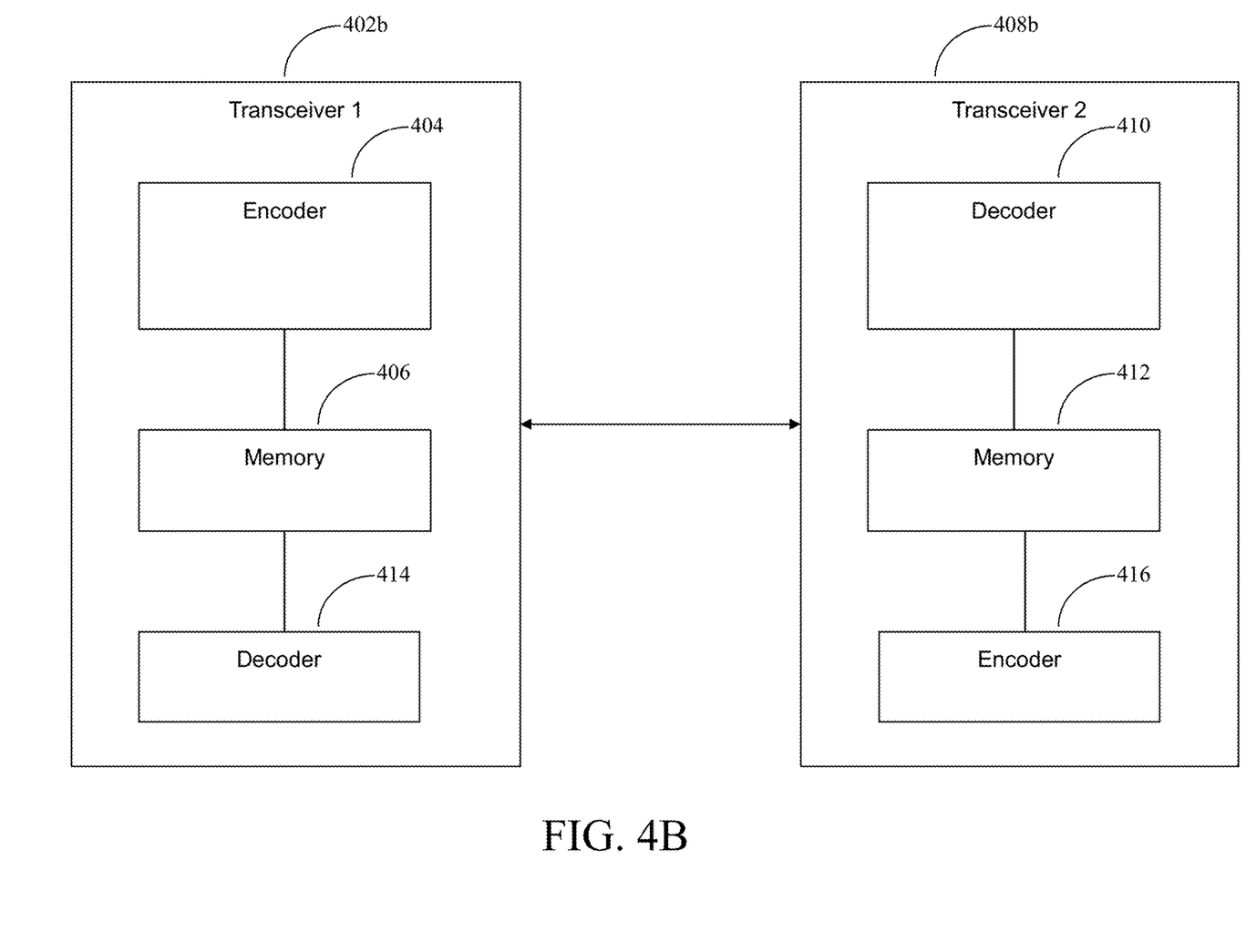
FIG. 4B is a diagram of another exemplary system for LPD communication in accordance with an embodiment of the present disclosure.

In an embodiment, transmitter 402a and receiver 408a can act as transceivers. For example, FIG. 4B is a diagram of another exemplary system for LPD communication in accordance with an embodiment of the present disclosure using transceivers. In FIG. 4B, transmitter 402a is a first transceiver 402b with a decoder 414 (e.g., a decoding device), and receiver 408a is a second transceiver 408b with an encoder 416 (e.g., an encoding device). In an embodiment, encoder 416 and decoder 414 include processing devices (e.g., computer processors) or can access processing devices. Using the known initial condition from first transceiver 402b, second transceiver 408b can not only receive signals but can also encode signals using encoder 416 and securely transmit the encoded signals to first transceiver 402b. First transceiver 402b can then decode the signals from second transceiver 408b using decoder 414.

Transmitter 402a, receiver 408a, first transmitter 402b, and second transmitter 408b can be implemented using hardware, software, and/or a combination of hardware or software. Components of transmitter 402a, receiver 408a, first transmitter 402b, and second transmitter 408b can be implemented using one device or a plurality of devices. Transmitter 402a, receiver 408a, first transmitter 402b, and second transmitter 408b can be implemented on general purpose computers or special purpose devices.

In an embodiment, transmitter 402a, receiver 408a, first transmitter 402b, and second transmitter 408b are implemented as special purpose devices (e.g., radio devices) that are specifically designed to communicate with each other using LPD communication in accordance with embodiments of the present disclosure. For example, in an embodiment, one or more chaotic maps and/or dictionaries of sequences are securely provided to transmitter 402a, receiver 408a, first transmitter 402b, and second transmitter 408b during manufacture of transmitter 402a, receiver 408a, first transmitter 402b, and second transmitter 408b. In an embodiment, each of transmitter 402a, receiver 408a, first transmitter 402b, and second transmitter 408b can synchronize to each other during use using these stored one or more chaotic maps and/or dictionaries of sequences.

In an embodiment, encoder 404 and decoder 410 are configured to synchronize transmitter 402a to receiver 408a and/or to synchronize first transceiver 402b to second transceiver 408b. In an embodiment encoder 404 and decoder 410 are further configured to encode and decode, respectively, signals sent between transmitter 402a and receiver 408a and/or between first transceiver 402b and second transceiver 408b.

In an embodiment, transmitter 402a, receiver 408a, first transceiver 402b, and/or second transceiver 408b further include synchronization modules configured to synchronize transmitter 402a to receiver 408a and/or to synchronize first transceiver 402b to second transceiver 408b. In an embodiment, encoder 404 and decoder 410 are configured to encode and decode, respectively, signals sent between transmitter 402a and receiver 408a and/or between first transceiver 402b and second transceiver 408b after synchronization has been performed by the synchronization modules.

5. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A first device configured to communicate with a second device, the first device comprising:
   a memory storing a dictionary of chaotic sequences in a chaotic map; and
   an encoder device configured to:
      seed the chaotic map with an initial condition,
      determine a set of chaotic sequences in the dictionary of chaotic sequences based on transition probabilities in the chaotic map,
      concatenate the set of chaotic sequences such that a last point in a last sequence in the set of chaotic sequences contains the initial condition, thereby generating a concatenated set of chaotic sequences, wherein the concatenated set of chaotic sequences is concatenated such that the concatenated set of chaotic sequences appears as noise to a third party that does not have access to the dictionary, and wherein the initial condition enables a Viterbi decoder in the second device to synchronize the first device to the second device, and
      transmit the concatenated set of chaotic sequences to the second device.

2. The first device of claim 1, wherein the first device is further configured to send a signal to the second device including the concatenated set of chaotic sequences.

3. The first device of claim 2, wherein the signal further includes a number of sequences in the set of chaotic sequences.

4. The first device of claim 1, wherein the first device is further configured to:
   build the dictionary of sequences based on e chaotic map.

5. The first device of claim 4, wherein the first device is further configured to:
   securely transmit the dictionary of sequences to the second device.

6. The first device of claim 1, wherein the first device is further configured to, for each sequence in the dictionary of sequences:
   generate points for a dictionary sequence in the dictionary of chaotic sequences based on the seeded chaotic map.

7. The first device of claim 1, wherein the first device is further configured to:
   partition points of the chaotic map into a plurality of clusters;
   determine respective center points of each cluster in the plurality of clusters: and
   generate the dictionary of sequences by iterating the respective center points for a number of dictionary sequences in the dictionary of sequences.

8. The first device of claim 1, wherein the first device is further configured to:
   determine a plurality of points close to an end of a first sequence in the set of sequences, wherein each point in the plurality of points corresponds to a beginning of a respective sequence in the dictionary of sequences; and
   select a second sequence in the set of sequences such that a beginning of the second sequence corresponds to a point in the plurality of points.

9. The first device of claim 8, wherein a number of points in the plurality of points is determined based on a capability of the Viterbi decoder.

10. The first device of claim 1, wherein the first device is further configured to:
    encode a signal to be sent to the second device based on a synchronization between the first device and the second device.

11. The first device of claim 1, herein the chaotic sequences have a flat power spectrum.

12. A first device, comprising:
    a memory storing a dictionary of chaotic sequences in a chaotic map; and
    a decoder device configured to:
       receive input comprising a concatenated set of chaotic sequences from a second device,
       determine, based on transition probabilities of the chaotic map, a location in the input of an initial condition in a first sequence in the concatenated set of chaotic sequences,
       examine a plurality of beginnings of respective chaotic sequences in the chaotic map, wherein each respective chaotic sequence is near an end of the first sequence, wherein each beginning in the plurality of beginnings comprises a predetermined number of points, and wherein a number of the predetermined number of points corresponds to a difficulty in decoding each respective chaotic sequence,
       determine subsequent sequences in the concatenated set of chaotic sequences based on the plurality of beginnings and the chaotic map, and
       synchronize the second device to the first device based on the concatenated set of chaotic sequences.

13. The first device of claim 12, wherein the decoder device is further configured to receive, from a single transmission from the second device:
    a number of sequences in the set of sequences,
    the concatenated set of sequences, and
    a state of the second device, wherein the decoder device is configured to identify the state of the second device in the signal transmission based on the number of sequences, the concatenated set of sequences, the dictionary of sequences, and the initial condition.

14. The first device of claim 12, wherein the decoder device is further configured to:
    decode a signal from the second device based on a synchronization between the first device and the second device.

15. The first device of claim 12, wherein the first device further comprises:
    an encoder configured to encode a signal to be sent from the second device to the first device based on a synchronization between the first device and the second device.

16. A method, comprising:
    seeding, using a transmitting device, the chaotic map with an initial condition;
    determining, using the transmitting device, a set of chaotic sequences in a dictionary of chaotic sequences in the chaotic map based on transition probabilities in the chaotic map;
    concatenating, using the transmitting device, the set of chaotic sequences such that a last point in a last sequence in the set of chaotic sequences contains the initial condition, thereby generating a concatenated set of chaotic sequences, wherein the concatenated set of chaotic sequences is concatenated such that the concatenated set of chaotic sequences appears as noise to a third party that does not have access to the dictionary, and wherein the initial condition enables a Viterbi decoder in a receiving device to synchronize the transmitting device to the receiving device, and transmitting, using the transmitting device, the concatenated set of chaotic sequences to the receiving device.

17. The method of claim 16, further comprising:

determining a plurality of points close to an end of a first sequence in the set of sequences, wherein each point in the plurality of points corresponds to a beginning of a respective sequence in the dictionary of sequences; and selecting a second sequence in the set of sequences such that a beginning of the second sequence corresponds to a point in the plurality of points.

18. The method of claim 16, further comprising:

encoding a signal to be sent to the receiving device based on a synchronization between the transmitting device and the receiving device.

19. The first device of claim 12, wherein the input is indistinguishable from noise to a third party that does not have the chaotic map.

20. The first device of claim 12, wherein the decoder device comprises a Viterbi decoder.

\* \* \* \* \*